United States Patent
Rodniansky et al.

(10) Patent No.: US 12,244,645 B2
(45) Date of Patent: Mar. 4, 2025

(54) IDENTIFYING OUTLIER APPLICATION CONNECTIONS TO SERVICES WITH CONTROLLED CONFIDENCE LEVEL AND IN REAL-TIME

(71) Applicant: International Business Machines Corporation, Armonk, NY (US)

(72) Inventors: Leonid Rodniansky, Allston, MA (US); Tania Butovsky, Needham, MA (US); Mikhail Shpak, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/955,109

(22) Filed: Sep. 28, 2022

(65) Prior Publication Data

US 2024/0106860 A1     Mar. 28, 2024

(51) Int. Cl.
    *H04L 9/40*          (2022.01)
    *H04L 41/16*       (2022.01)
    *H04L 43/0811*    (2022.01)

(52) U.S. Cl.
    CPC ............. *H04L 63/20* (2013.01); *H04L 41/16* (2013.01); *H04L 43/0811* (2013.01)

(58) Field of Classification Search
    CPC ..... H04L 63/20; H04L 41/16; H04L 43/0811; H04L 63/1425
See application file for complete search history.

(56) References Cited

U.S. PATENT DOCUMENTS

| | | | |
|---|---|---|---|
| 6,359,860 B1 * | 3/2002 | Ando | H04L 41/0686 370/252 |
| 7,333,923 B1 * | 2/2008 | Yamanishi | G06Q 10/06395 706/14 |
| 9,531,742 B2 * | 12/2016 | Kohout | H04L 63/1425 |
| 10,685,293 B1 * | 6/2020 | Heimann | H04L 63/1425 |
| 11,210,604 B1 * | 12/2021 | Jeffery | G06N 20/00 |
| 11,606,378 B1 * | 3/2023 | Delpont | H04L 43/16 |
| 11,979,754 B2 * | 5/2024 | Bedekar | H04W 76/10 |

(Continued)

OTHER PUBLICATIONS

Assent et al., "Anyout Anytime outlier detection on streaming data," International Conference on Database Systems for Advanced Applications, Springer, Berlin, Heidelberg, 2012.

(Continued)

*Primary Examiner* — J. Brant Murphy
(74) *Attorney, Agent, or Firm* — Patterson + Sheridan, LLP

(57) ABSTRACT

Techniques for identifying outlier application connections for computer security are described. These techniques include identifying one or more connections between a client application and one or more services, over a communication network, and determining to switch from an outlier connection learning phase to an outlier connection detection phase based on the identified or more connections, including determining, in real-time and based on a confidence level and a number of previously analyzed connections, to switch to the outlier connection detection phase. The techniques further include determining, based on the switch to the outlier connection detection phase, that a first connection of the identified one or more connections is an outlier connection, and acting to reduce a security risk relating to the first connection.

20 Claims, 6 Drawing Sheets

(56) References Cited

U.S. PATENT DOCUMENTS

| | | | |
|---|---|---|---|
| 2007/0091918 A1* | 4/2007 | Luo | H04L 47/15 370/252 |
| 2016/0080404 A1* | 3/2016 | Kohout | H04L 63/20 726/23 |
| 2017/0346853 A1* | 11/2017 | Wyatt | H04W 12/122 |
| 2021/0294787 A1* | 9/2021 | Balasubramanian | G06F 17/18 |
| 2021/0321262 A1* | 10/2021 | Inami | H04W 12/50 |
| 2021/0351973 A1* | 11/2021 | Ford | H04L 43/067 |
| 2024/0028616 A1* | 1/2024 | Chintakunta | G06F 16/285 |

OTHER PUBLICATIONS

Yamanishi et al., "On-linne unsupervised outlier detection using finite mixtures with discounting learning algorithms," Data Mining and Knowledge Discovery 8.3 (2004): 275-300.

Yu et al. "Real-time outlier detection over streaming data." 2019 IEEE SmartWorld, Ubiquitous Intelligence & Computing, Advanced & Trusted Computing, Scalable Computing & Communications, Cloud & Big Data Computing, Internet of People and Smart City Innovation (SmartWorld/SCALCOM/UIC/ATC/CBDCom/IOP/SCI). IEEE, 2019.

Birmingham et al., "CTOD: Collaborative Tree-Based Outlier Detection in Wireless Sensor Networks," Dated: Jul. 31, 2010, pp. 1-18.

Vengentsev et al., "Anomaly detection in graph: unsupervised learning, graph-based features and deep architecture." Dept. Comput. Sci., Stanford Univ., Stanford, CA, USA, Tech. Rep (2015).

Grace Period Disclosure: IBM Security Guardium Appliances version 11.5, Leonid Rodniansky, Mikhail Shpak, Tania Butovsky, Sep. 16, 2022.

\* cited by examiner

IDENTIFYING OUTLIER APPLICATION CONNECTIONS TO SERVICES WITH CONTROLLED CONFIDENCE LEVEL AND IN REAL-TIME

STATEMENT REGARDING PRIOR DISCLOSURES BY THE INVENTOR OR A JOINT INVENTOR

The following disclosure(s) are submitted under 35 U.S.C. 102(b)(1)(A) as having been made by the named inventors of this application:
DISCLOSURE: IBM Security Guardium Appliances version 11.5, Leonid Rodniansky, Mikhail Shpak, Tania Butovsky, Sep. 16, 2022.

BACKGROUND

The present invention relates to computer security, and more specifically, to identifying outlier application connections.

SUMMARY

Embodiments include a method. The method includes identifying one or more connections between a client application and one or more services, over a communication network. The method further includes determining to switch from an outlier connection learning phase to an outlier connection detection phase based on the identified or more connections, including determining, in real-time and based on a confidence level and a number of previously analyzed connections, to switch to the outlier connection detection phase. The method further includes determining, based on the switch to the outlier connection detection phase, that a first connection of the identified one or more connections is an outlier connection. The method further includes acting to reduce a security risk relating to the first connection.

Embodiments further include a system, including a processor and a memory having instructions stored thereon which, when executed on the processor, performs operations. The operations include identifying one or more connections between a client application and one or more services, over a communication network. The operations further include determining to switch from an outlier connection learning phase to an outlier connection detection phase based on the identified or more connections, including determining, in real-time and based on a confidence level and a number of previously analyzed connections, to switch to the outlier connection detection phase. The operations further include determining, based on the switch to the outlier connection detection phase, that a first connection of the identified one or more connections is an outlier connection. The operations further include acting to reduce a security risk relating to the first connection.

Embodiments further include a computer program product including a computer-readable storage medium having computer-readable program code embodied therewith, the computer-readable program code executable by one or more computer processors to perform operations. The operations include identifying one or more connections between a client application and one or more services, over a communication network. The operations further include determining to switch from an outlier connection learning phase to an outlier connection detection phase based on the identified or more connections, including determining, in real-time and based on a confidence level and a number of previously analyzed connections, to switch to the outlier connection detection phase. The operations further include determining, based on the switch to the outlier connection detection phase, that a first connection of the identified one or more connections is an outlier connection. The operations further include acting to reduce a security risk relating to the first connection.

DETAILED DESCRIPTION

Detecting outliers in real-time application connectivity data, to identify potential network security risks, is a vital component of network security. In an embodiment, outlier connections are atypical connections that present a potential security risk. It is often desired to have outlier detection algorithms that are extremely fast, in order to operate in real-time or near real-time, and at the same time be able to minimize false positive outlier detection results. But in practice this is very challenging.

For example, assume a network security solution monitors application connections and identifies suspicious behavior in real-time. The network security solution can intercept client connections to application services, and can use a set of security rules to identify potential security violations. But it is very challenging for existing solutions to efficiently, and accurately, identify outlier connections (e.g., in real-time or near real-time).

One or more techniques disclosed herein can be used to identify outlier connections. For example, a network security software service can monitor application connections. The security service can undertake an initial learning phase to identify characteristics of normal connections. After the learning period is finished, the security service can transition to a detection phase and detect outlier connections. The security service can then take an appropriate action, including alerting another software service or a human administrator to take an appropriate action, in real-time or near real-time to alleviate the problem. For example, the security service can transmit an alert describing a suspicious connection, or can block the connection (e.g., automatically, without human intervention). These are merely examples, and the security service can use any suitable techniques.

In an embodiment, it is particularly challenging to identify when to transition from a learning phase to a detection phase. One problem is that for a stream with a large volume of connections (e.g., thousands of connections), an incorrectly trained security service (e.g., a security service that exits the learning phase too early) can cause many false positives. This could render such an outlier detection scheme meaningless. But exiting the learning phase too late is also problematic. This wastes computational resources on training, which could instead be devoted to detection, and presents potential security risks during the learning phase if potential outliers are not yet being detected. In an embodiment, one or more techniques disclosed herein describe use of a confidence level to identify when the learning phase can be safely exited, based on analyzing connection parameters. This can identify a preferred time to transition from a learning phase to an outlier detection phase.

Figure 1:
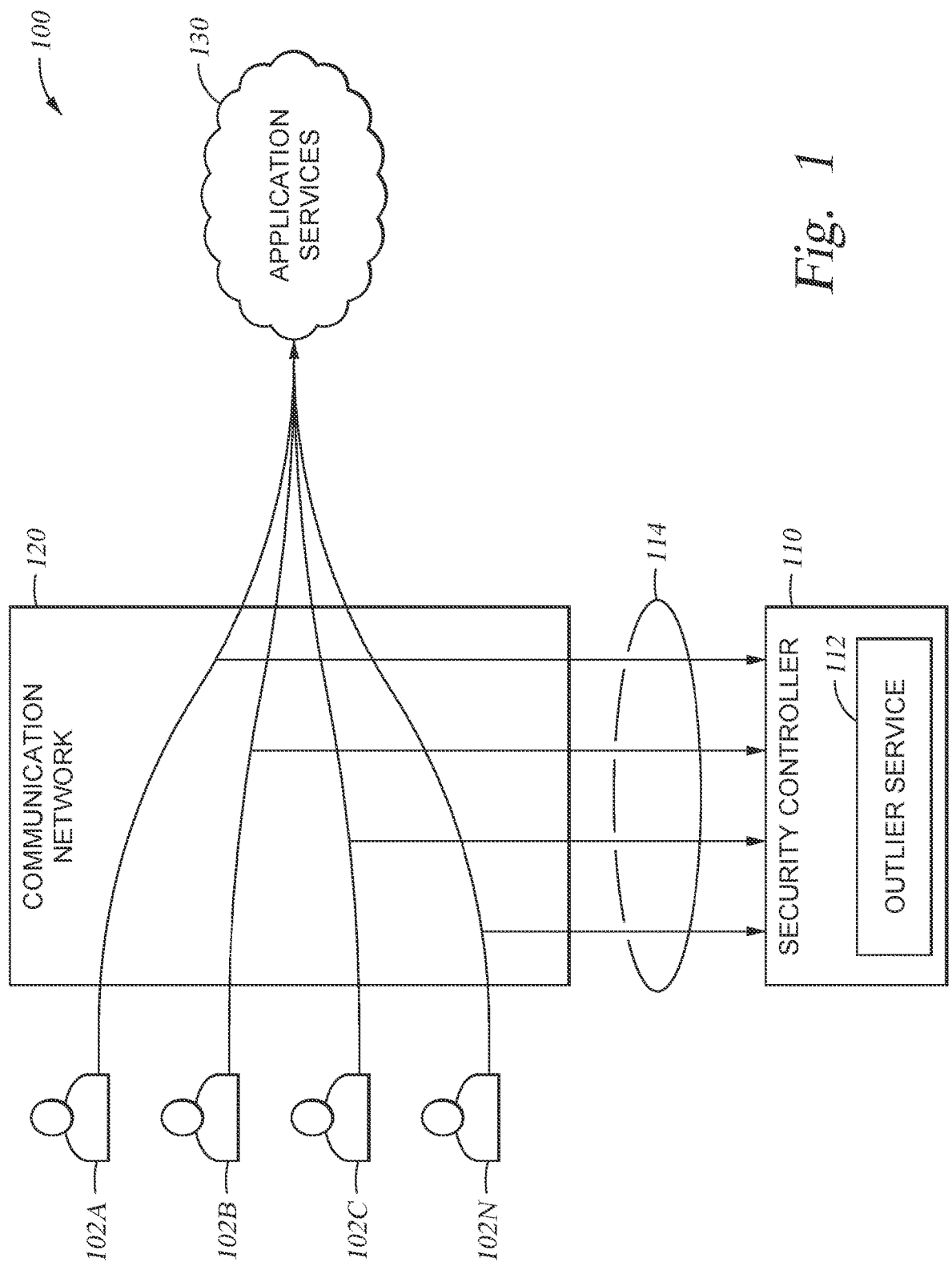
FIG. 1 illustrates a computing environment for identifying outlier network application connections, according to one embodiment.

FIG. 1 illustrates a computing environment 100 for identifying outlier network application connections, according to one embodiment. In an embodiment, a number of client applications 102A-N connect to one or more application services 130 using a communication network 120. For example, the client applications 102A-N can be applications running on one or more user devices, and the client applications 102A-N can connect to the application services 130 using the communication network 120 as part of normal operations.

For example, each connection $C_i$ can be represented by a vector of its parameters $c_j$: $C_i = \{c_1, c_j, \ldots c_k\}$, $j \in [1, k]$. In an embodiment, these connection parameters c 1 can represent various characteristics of the network application connections, including host names, Internet Protocol (IP) addresses, program names, users, application time zones, authentication methods, driver names, and any other suitable characteristics. These are merely examples.

In an embodiment, a security controller 110 can intercept connections 114 from the client applications 102A-N to the application services 130, using the communication network 120. For example, the security controller 110 can intercept the connections 114 in real-time, or near real-time. An outlier service 112 can then facilitate identifying outlier connections, among the intercepted connections.

In an embodiment, outlier connections are network application connections that deviate from expected, normal, connections. For example, the outlier service 112 can gather characteristics of the intercepted connections 114 (e.g., extracting metadata of the intercepted connections 114) and can analyze the characteristics to identify outlier connections. The outlier service 112 can identify outlier connections by comparing the intercepted connections 114 to a collection of prior analyzed connections (e.g., gathered during a learning phase). For example, the outlier service 112 can identify an intercepted connection 114 as an outlier if it includes characteristics not seen during the learning phase.

As discussed below in relation to FIG. 3, the outlier service 112 switches from a learning phase to a detection phase when it has analyzed a sufficient sample of intercepted connections 114 to accurately identify outlier connections. For example, the outlier service 112 can use a confidence level to identify, in real-time or near real-time, when to transition from the learning phase to the detection phase. This is discussed further, below, with regard to FIG. 4.

In an embodiment, the communication network 120 can be any suitable communication network, including the Internet, a wide area network, a local area network, or a cellular network. The client applications 102A-N can access the communication network 120 through any suitable electronic or computing device, including a smartphone, a tablet, a laptop computer, a desktop computer, or any other suitable device. Further, the client applications 102A-N can access the communication network 120 using any suitable wired or wireless communication technique (e.g., an Ethernet connection, a WiFi connection, a cellular connection, or any other suitable network connection).

Figure 2:
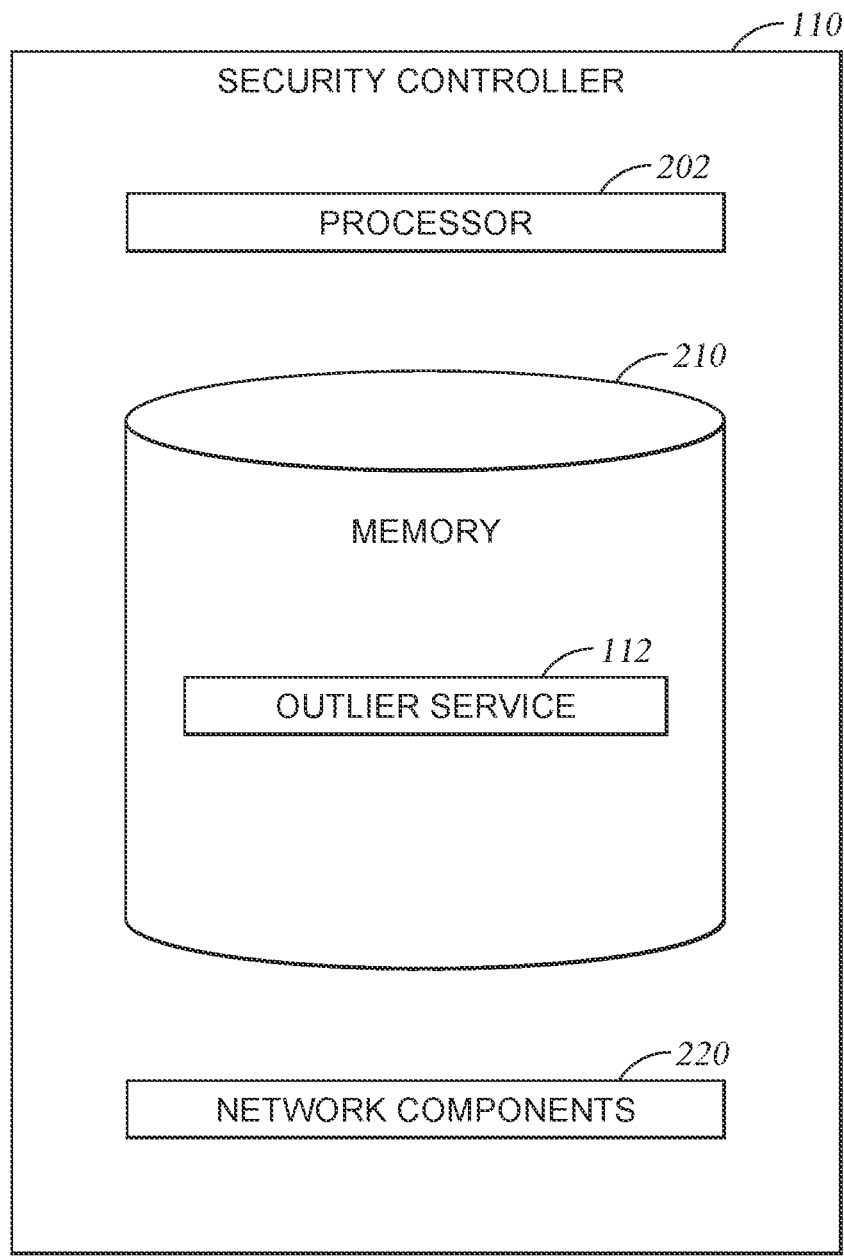
FIG. 2 illustrates a security controller for identifying outlier network application connections, according to one embodiment.

FIG. 2 illustrates a security controller 110 for identifying outlier network application connections, according to one embodiment. The security controller 110 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the security controller 110 to interface with a suitable communication network (e.g., the communication network 120 interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the security controller 110. The program code is generally described as various functional "applications" or "modules" within the memory 210, although alternate implementations may have different functions and/or combinations of functions. Within the memory 210, the outlier service 112 facilitates identifying outlier application network connections. This is discussed further, below, with regard to FIGS. 3-4.

While the security controller 110 is illustrated as a single entity, in an embodiment, the various components can be implemented using any suitable combination of physical compute systems, cloud compute nodes and storage locations, or any other suitable implementation. For example, the security controller 110 could be implemented using a server or cluster of servers. As another example, the security controller 110 can be implemented using a combination of compute nodes and storage locations in a suitable cloud environment (e.g., as discussed further below). For example, one or more of the components of the security controller 110 can be implemented using a public cloud, a private cloud, a hybrid cloud, or any other suitable implementation.

Although FIG. 2 depicts the outlier service 112 as being located in the memory 210, that representation is also merely provided as an illustration for clarity. More generally, the security controller 110 may include one or more computing platforms, such as computer servers for example, which may be co-located, or may form an interactively linked but distributed system, such as a cloud-based system, for instance. As a result, the processor 202, and the memory 210, may correspond to distributed processor and memory resources within the computing environment 100. Thus, it is to be understood that the outlier service 112 may be stored at any suitable location within the distributed memory resources of the computing environment 100.

Figure 3:
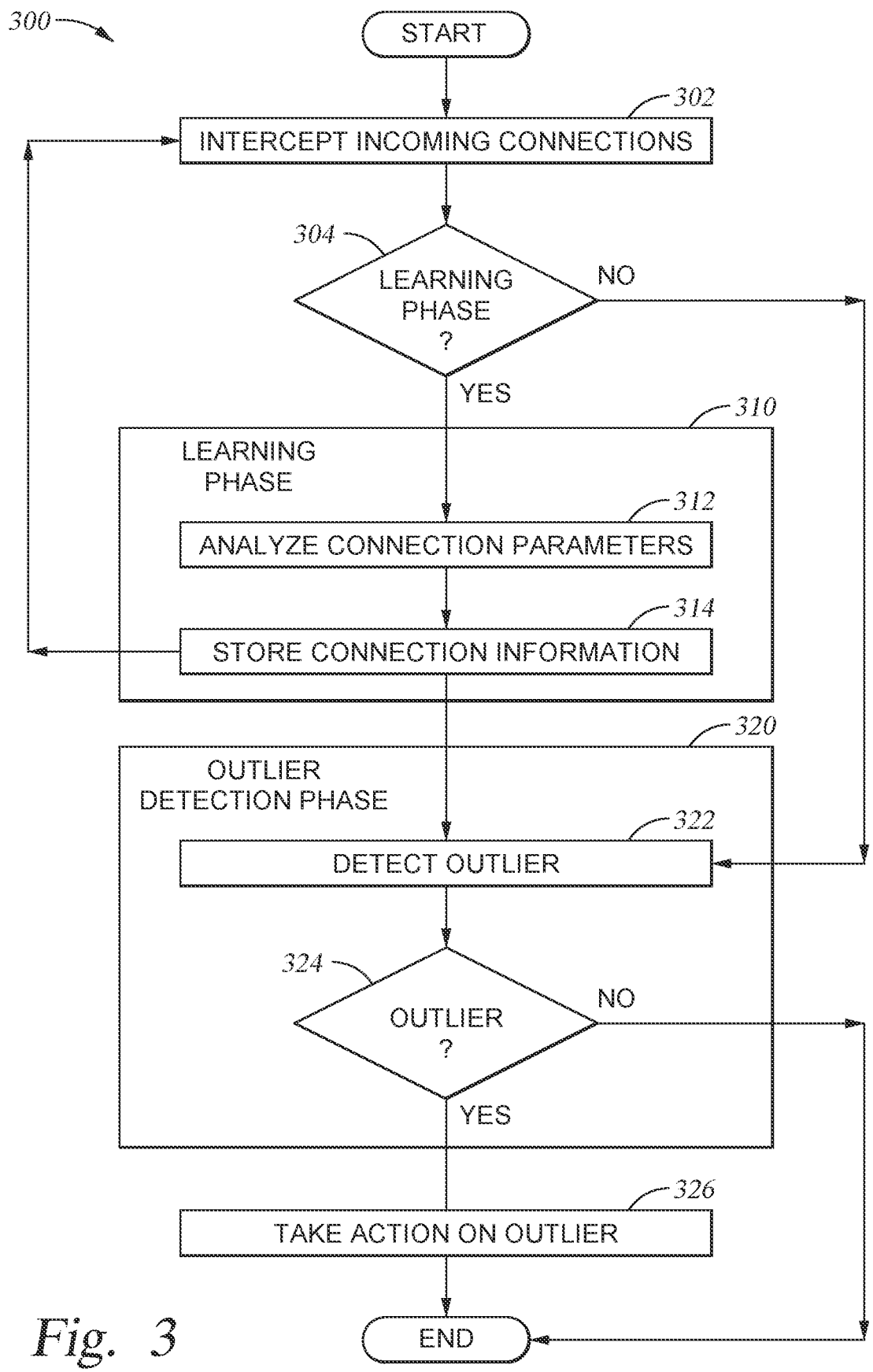
FIG. 3 illustrates a flowchart for identifying outlier network application connections, according to one embodiment.

FIG. 3 illustrates a flowchart 300 for identifying outlier network application connections, according to one embodiment. At block 302 an outlier service (e.g., the outlier service 112 illustrated in FIGS. 1-2) intercepts incoming connection. For example, the outlier service can intercept one or more connections between client applications and local or remote services (e.g., the intercepted connections 114 illustrated in FIG. 1). In an embodiment, the outlier service intercepts the connections in real-time or near real-time.

At block 304, the outlier service determines whether it should remain in a learning phase. For example, in a learning phase the outlier service can analyze connections to set a baseline for what qualifies as a non-outlier normal connection. In a detection phase, the outlier service can compare intercepted connections to the learned normal connections to identify likely outlier connections. In an embodiment, the outlier service can determine whether to switch from a learning phase to a detection phase by identifying whether a sufficient sample of network application connections has been analyzed in a learning phase (e.g., based on a ratio of total observed connections to distinct observed connections). If a sufficient number of connections have been observed, then the outlier service transitions from a learning phase to a detection phase. If not, then the outlier service remains in the learning phase. This is discussed further, below, with regard to FIG. 4.

If the outlier service determines that it is in a learning phase, the flow proceeds to a learning phase 310, which includes blocks 312 and 314. At block 312, the outlier service analyzes connection parameters. For example, as discussed above in relation to FIG. 1, one or more connection parameters $c_j$ can represent various characteristics of the network application connections, including host names, IP addresses, program names, users, application time zones, authentication methods, driver names, and any other suitable characteristics. These are merely examples.

At block 314, the outlier service stores connection information. In an embodiment, the outlier service considers connections analyzed during a learning phase to be non-outlier normal connections. The outlier service stores the characteristics of these connections, and uses the stored connections to identify outlier connections (e.g., at block 322 illustrated in FIG. 3). The outlier service can use any suitable electronic repository. The flow then returns to block 302.

Returning to block 304, if the outlier service determines that it is not in a learning phase (or should transition from a learning phase to a detection phase), the flow proceeds to an outlier detection phase 320, which includes blocks 322 and 324. At block 322, the outlier service detects outliers (e.g., among the intercepted incoming connections at block 302). For example, the outlier service can compare characteristics of the one or more intercepted connections with the characteristics of the prior connections stored at block 314 (e.g., previously stored as part of a learning phase). If the intercepted connection characteristics differ from the previously stored connection information (or differ sufficiently), the outlier service considers the intercepted connections as outliers. This is discussed further, below, with regard to FIG. 5.

At block 324, the outlier service determines whether any of the intercepted connections are outliers. If not, the flow ends. But if so, the flow proceeds to block 326.

At block 326, the outlier service takes action on the outlier. In an embodiment, the outlier service alerts another software service, or a human administrator, to take an appropriate action to alleviate the problem. The outlier service can transmit this alert in real-time, or near real-time, to allow for rapid correction of the problem. For example, the outlier service can transmit an alert describing a suspicious connection. Alternatively, or in addition, the outlier service takes action to reduce security risk from the outlier connection. For example, the outlier service can block the outlier connection, or can limit the ability of the outlier connection to interact with the remove service (e.g., limit available services and data at the service accessible to the outlier connection). These are merely examples, and the outlier service can use any suitable techniques.

Figure 4A:
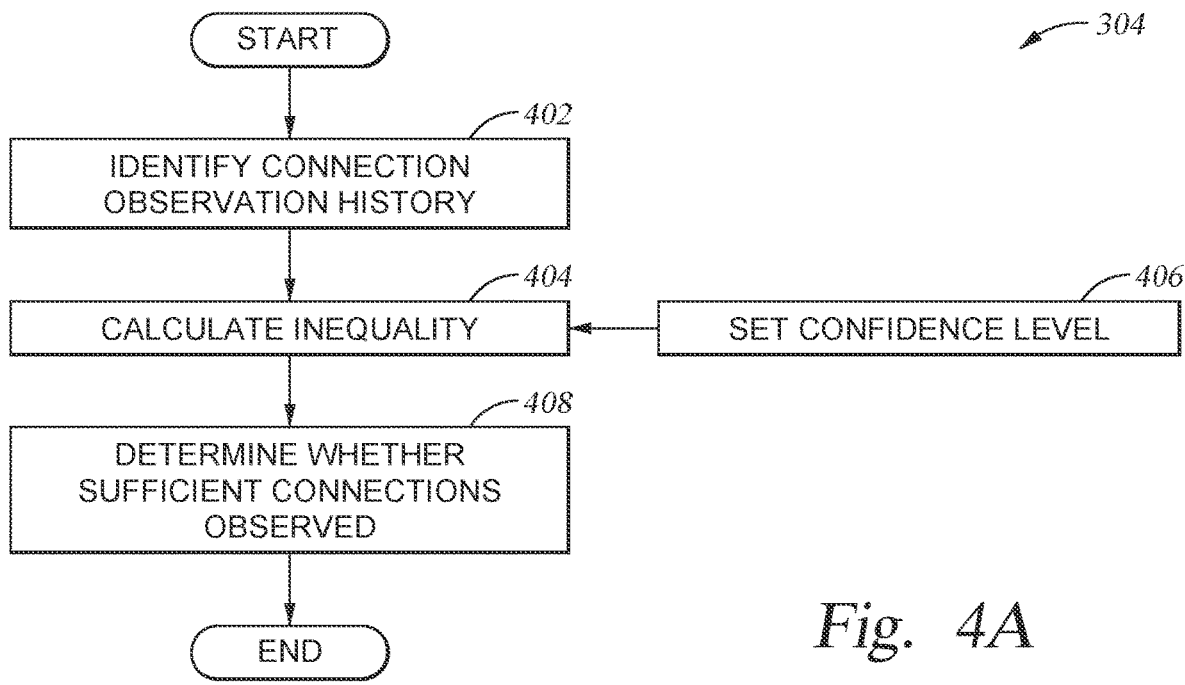
FIG. 4A illustrates a flowchart for determining whether to exit a learning phase for identifying outlier network application connections, according to one embodiment.

FIG. 4A illustrates a flowchart for determining whether to exit a learning phase for identifying outlier network application connections, according to one embodiment. In an embodiment, FIG. 4A corresponds with block 304 illustrated in FIG. 3. As discussed above, in an embodiment an outlier service (e.g., the outlier service 112 illustrated in FIGS. 1-2) can determine when to exit a learning phase based on calculating that a sufficient number of connections have been observed during the learning phase. This can be based on a ratio of the total number of connections observed to a number of distinct connections observed during the learning phase. This is discussed further, below, with regard to block 404.

At block 402, the outlier service identifies a connection observation history. For example, the outlier service can identify a total number of connections observed (e.g., in a learning phase), represented by N. The outlier service can further identify a total number of distinct connections observed in the learning phase, represented by n. The outlier service can increment the value of N each time a new connection is observed, and can increment a value of n each time a new distinct connection is observed. Distinct and total connections is merely one example, and any suitable connection observation history can be used.

At block 404, the outlier service calculates an inequality using observed connections and a confidence level. As discussed further below, with regard to block 406, in an embodiment the outlier service receives a desired confidence level that all detected outliers are not false positives (e.g., that identified outliers are actually outliers and not normal connections incorrectly identified as outliers). The outlier service can use this confidence level, and observed connection information, to calculate an inequality and determine whether sufficient connections have been observed. By using a confidence level, the outlier service can control the expected number of false positives and make outlier detection independent of the specific service being observed. For example, the outlier service could be configured to switch from the learning phase to the outlier detection phase when it has 95% confidence that the detected outlier connections are not false positives.

In an embodiment, the outlier service determines whether sufficient connections have been observed based on the total number of observed connections N and the number of distinct observed connections n. Let the probability $P_{n,N}$ represent the probability that all possible n distinct connections (e.g., all distinct non-outlier normal connections) have occurred in N total observations. The probability $P_{n,N}$ will be greater than the confidence level $1-\delta$ (e.g., 1-0.05 for a 95% confidence level) when the inequality $N > n * \ln n/\delta$ is satisfied.

This can be shown through the following mathematical proof. The probability that one specific connection does not appear after N observations is $$\left(1-\frac{1}{n}\right)^N.$$

In total there are n distinct connections, then:

$$P_{n,N} \cong 1 - n*\left(1-\frac{1}{n}\right)^N.$$

Let confidence level be 1−δ where δ is the small value close to zero (e.g., 0.05 for a confidence level of 95%). The condition that all different n connections occurred during N observations with a confidence level of 1−δ is express as $P_{n,N}>1-\delta$. This leads to the inequality $$-N*\ln\left(1-\frac{1}{n}\right) > \ln\frac{n}{\delta}.$$

For large values of n, it is true that ln $$\left(1-\frac{1}{n}\right) \cong -\frac{1}{n}.$$

This leads to the inequality N>n*ln n/δ. If this inequality is true, then with confidence level 1−δ for N observations, all possible n distinct connections have occurred.

An example may be instructive. Assume that connections are different depending on the application client host name (e.g., the host names for the client applications 102A-N illustrated in FIG. 1). The outlier service monitors all incoming connections and at some point, after N=10000 observations, it detects n=1000 different application client host names. Suppose δ=0.05. Then, based on the inequality above, with a confidence level of more than 0.95 (e.g., a probability that all possible connections with different application host names have already been observed), the outlier service can assume that there are no other distinct connections and learning phase can be finished. Thus, if the outlier service continues to monitor all incoming connections and finds a connection from a not-yet-observed application host name, the outlier service can classify the connection as an outlier with a high level of confidence.

At block 406, the outlier service sets the confidence level. A discussed above, the value of δ in the inequality N>n*ln n/δ corresponds to the confidence level: the confidence level is 1−δ. The confidence level can be set manually (e.g., by an administrator) by default or using a suitable user interface (e.g., a graphical user interface).

At block 408, the outlier service determines whether sufficient connections have been observed. As discussed above, the required total number of connections observed, N can be determined based on the inequality N>n*ln n/δ. When this inequality is satisfied, the outlier service determines that sufficient connections have been observed (e.g., so that the outlier service can transition from a learning phase to a detection phase). When this inequality is not satisfied, the outlier service determines that sufficient connections have not yet been observed (e.g., so that the outlier service should remain in a learning phase).

Figure 4B:
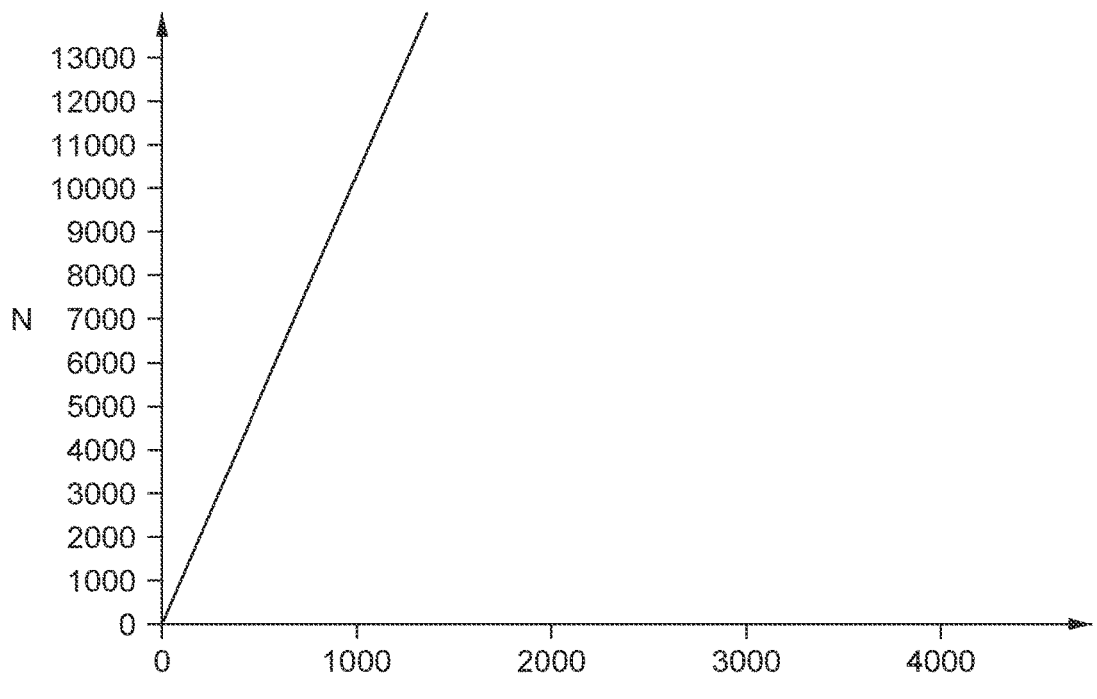
FIG. 4B illustrates when a sufficient number of connections have been observed to meet a confidence level for identifying outlier network application connections, according to one embodiment.

FIG. 4B illustrates when a sufficient number of connections have been observed to meet a confidence level for identifying outlier network application connections, according to one embodiment. In an embodiment, FIG. 4B provides a graphical illustration of the inequality N>n*ln n/δ discussed above in relation to FIG. 4A, with an example confidence level of 95% (e.g., δ=0.05). As illustrated, N is the total number of observed connections and n is the number of distinct connections. The line represents the values of (N, n) at which the inequality is met, meaning sufficient connections have been observed to meet the example 95% confidence level and to transition from a learning phase to a detection phase.

Figure 5:
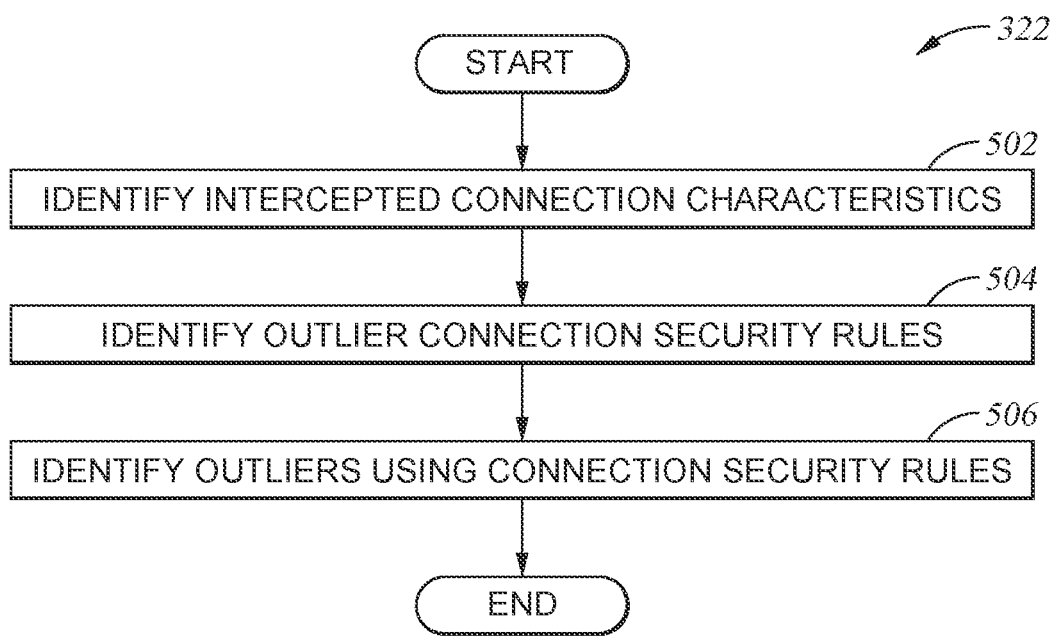
FIG. 5 illustrates a flowchart for identifying outlier network application connections, according to one embodiment.

FIG. 5 illustrates a flowchart for identifying outlier network application connections, according to one embodiment. In an embodiment, FIG. 5 corresponds with block 322 illustrated in FIG. 3. At block 502, an outlier service (e.g., the outlier service 112 illustrated in FIGS. 1-2) identifies intercepted connection characteristics. As discussed above in relation to FIGS. 1 and 3, one more intercepted connections (e.g., the intercepted connections 114 illustrated in FIG. 1) include one or more characteristics. These characteristics include including host names, IP addresses, program names, users, application time zones, authentication methods, driver names, and any other suitable characteristics. These are merely examples.

At block 504, the outlier service identifies outlier connection security rules. In an embodiment, a security controller (e.g., the security controller 110 illustrated in FIGS. 1-2) serves numerous functions, many of which are governed by rules. The outlier service can identify a repository of rules (e.g., an electronic database, cloud repository, or any other suitable electronic repository) and can select outlier rules from among the available security rules.

At block 506, the outlier service identifies outliers using the connection security rules. For example, the connection security rules can identify which connection characteristics should be used to identify outliers. The outlier service can compare the relevant characteristics of the intercepted connections, with corresponding stored characteristics of prior connections during the learning phase (e.g., using the connection information stored at block 314 illustrated in FIG. 3), and can identify outliers based on the comparison. For example, an intercepted connection with relevant characteristics (e.g., hostname, IP address, port, etc.) that do not match any prior connections (or do not match a suitable quantity of prior connections) can be deemed an outlier. This is merely an example, and the connection security rules can use any suitable technique to identify outliers (e.g., based on comparing characteristics of the intercepted connections with prior connections during the learning phase).

Further, in an embodiment, the outlier service can use multiple connection security rules. For example, an intercepted connection can be considered an outlier if it matches any of the outlier connection security rules. As another example, an intercepted connection can be conserved an outlier if it matches a suitable number (or threshold) of outlier connection security rules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
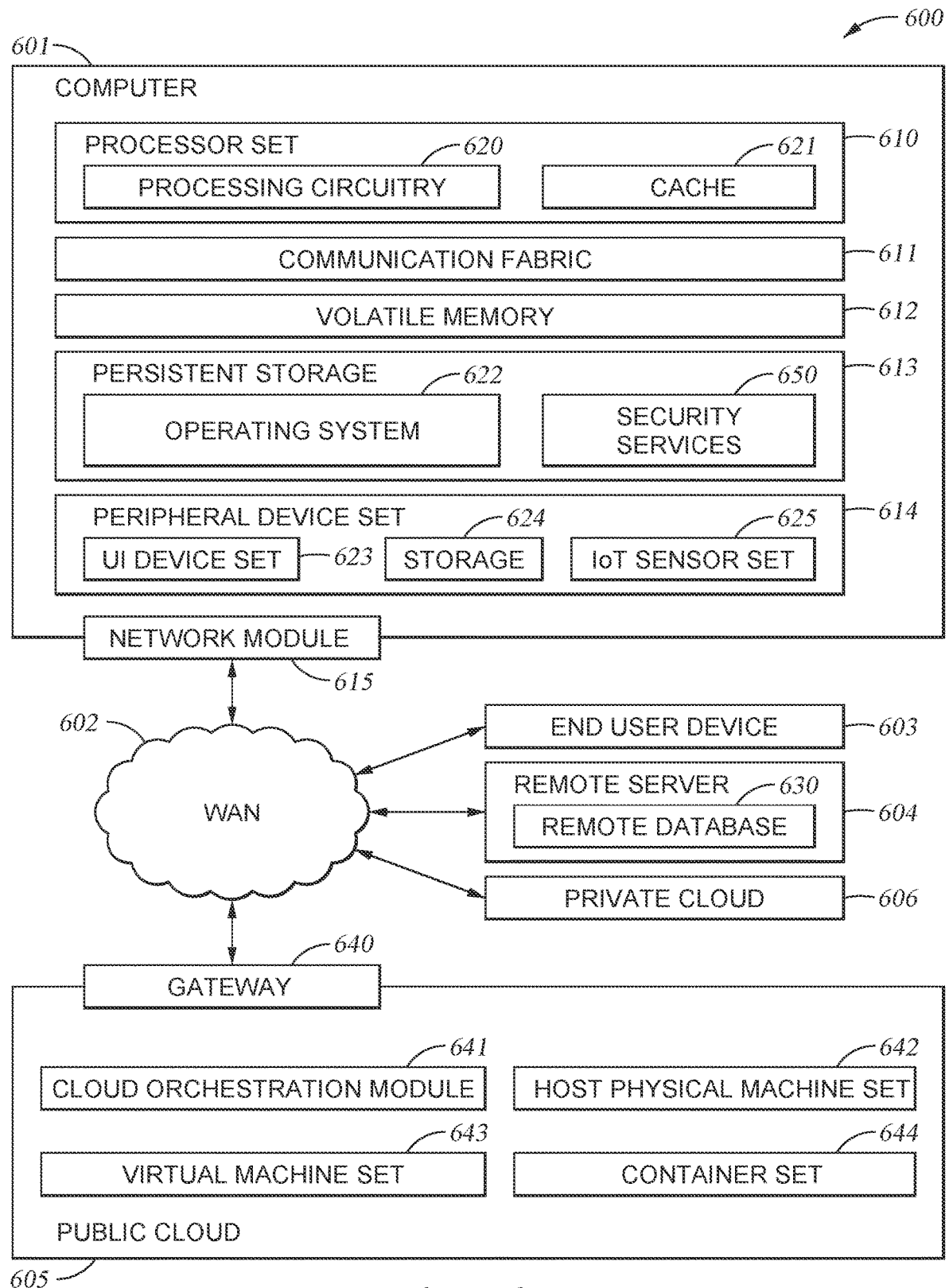
FIG. 6 further illustrates a computing environment, according to one embodiment.

Computing environment 600 in FIG. 6 contains an example of an environment for the execution of at least some of the computer code involved in performing the inventive methods, such as security services block 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A method comprising:
   identifying one or more connections between a client application and one or more services, over a communication network;
   determining to switch from an outlier connection learning phase to an outlier connection detection phase based on the identified one or more connections, comprising:
      determining, in real-time and based on a confidence level and a number of previously analyzed connections, to switch to the outlier connection detection phase;
   determining, based on the switch to the outlier connection detection phase, that a first connection of the identified one or more connections is an outlier connection; and
   acting to reduce a security risk relating to the first connection.

2. The method of claim 1, wherein determining, in real-time and based on the confidence level and the number of previously analyzed connections, to switch to the outlier connection detection phase comprises:
   comparing a number of distinct connections relating to the services with a total number of connections relating to the services, while connections are ongoing between the client application and the one or more services.

3. The method of claim 2, wherein comparing a number of distinct connections relating to at least one of the services with a total number of connections relating to at least one of the services comprises:
   determining that $(N > n * \ln n/\delta)$, where N is the total number of connections, n is the number of distinct connections, and the confidence level is $(1-\delta)$.

4. The method of claim 2, wherein the confidence level is provided by a user using a user interface.

5. The method of claim 1, wherein determining, based on the switch to the outlier connection detection phase, that the first connection of the identified one or more connections is an outlier connection comprises:
   determining, based on a first one or more characteristics of the first connection and a second one or more characteristics relating to a plurality of prior connections, that the first connection is an outlier connection.

6. The method of claim 5,
   wherein the second one or more characteristics relating to a plurality of prior connections are gathered during the learning phase and stored in an electronic repository, and
   wherein determining, based on the first one or more characteristics of the first connection and a second one or more characteristics relating to the plurality of prior connections, that the first connection is an outlier connection comprises retrieving the second one or more characteristics relating to the plurality of prior connections from the electronic repository.

7. The method of claim 5, wherein the first one or more characteristics comprise one or more of: (i) a host name, (ii) an Internet Protocol (IP) address, (iii) a program name, (iv) a user, (v) an application time zone, (vi) an authentication method, or (vii) a driver name.

8. The method of claim 1, further comprising:
   before identifying the one or more connections, identifying a second one or more connections between the client application and the one or more services, over the communication network; and
   determining not to switch from the outlier connection learning phase to the outlier connection detection phase based on the second identified or more connections, comprising:
      determining, based on the confidence level and a second number of connections analyzed prior to identifying the second one or more connections, not to switch to the outlier connection detection phase.

9. The method of claim 8, further comprising:
identifying one or more characteristics relating to the identified second one or more connections during the learning phase; and
storing the identified one or more characteristics in an electronic repository.

10. The method of claim 1, wherein acting to reduce the security risk relating to the first connection comprises at least one of: (i) initiating an alert relating to the first connection or (ii) automatically blocking the first connection, without human intervention.

11. A system, comprising:
a processor; and
a memory having instructions stored thereon which, when executed on the processor, performs operations comprising:
identifying one or more connections between a client application and one or more services, over a communication network;
determining to switch from an outlier connection learning phase to an outlier connection detection phase based on the identified or more connections, comprising:
determining, in real-time and based on a confidence level and a number of previously analyzed connections, to switch to the outlier connection detection phase;
determining, based on the switch to the outlier connection detection phase, that a first connection of the identified one or more connections is an outlier connection; and
acting to reduce a security risk relating to the first connection.

12. The system of claim 11, wherein determining, in real-time and based on the confidence level and the number of previously analyzed connections, to switch to the outlier connection detection phase comprises:
comparing a number of distinct connections relating to the services with a total number of connections relating to the services, while connections are ongoing between the client application and the one or more services.

13. The system of claim 12, wherein comparing a number of distinct connections relating to at least one of the services with a total number of connections relating to at least one of the services comprises:
determining that $(N > n * \ln n/\delta)$, where N is the total number of connections, n is the number of distinct connections, and the confidence level is $(1-\delta)$.

14. The system of claim 11, wherein determining, based on the switch to the outlier connection detection phase, that the first connection of the identified one or more connections is an outlier connection comprises:
determining, based on a first one or more characteristics of the first connection and a second one or more characteristics relating to a plurality of prior connections, that the first connection is an outlier connection.

15. The system of claim 11, the operations further comprising:
before identifying the one or more connections, identifying a second one or more connections between the client application and the one or more services, over the communication network; and
determining not to switch from the outlier connection learning phase to the outlier connection detection phase based on the second identified or more connections, comprising:
determining, based on the confidence level and a second number of connections analyzed prior to identifying the second one or more connections, not to switch to the outlier connection detection phase.

16. A computer program product comprising:
a computer-readable storage medium having computer-readable program code embodied therewith, the computer-readable program code executable by one or more computer processors to perform operations, comprising:
identifying one or more connections between a client application and one or more services, over a communication network;
determining to switch from an outlier connection learning phase to an outlier connection detection phase based on the identified or more connections, comprising:
determining, in real-time and based on a confidence level and a number of previously analyzed connections, to switch to the outlier connection detection phase;
determining, based on the switch to the outlier connection detection phase, that a first connection of the identified one or more connections is an outlier connection; and
acting to reduce a security risk relating to the first connection.

17. The computer program product of claim 16, wherein determining, in real-time and based on the confidence level and the number of previously analyzed connections, to switch to the outlier connection detection phase comprises:
comparing a number of distinct connections relating to the services with a total number of connections relating to the services, while connections are ongoing between the client application and the one or more services.

18. The computer program product of claim 17, wherein comparing a number of distinct connections relating to at least one of the services with a total number of connections relating to at least one of the services comprises:
determining that $(N > n * \ln n/\delta)$, where N is the total number of connections, n is the number of distinct connections, and the confidence level is $(1-\delta)$.

19. The computer program product of claim 16, wherein determining, based on the switch to the outlier connection detection phase, that the first connection of the identified one or more connections is an outlier connection comprises:
determining, based on a first one or more characteristics of the first connection and a second one or more characteristics relating to a plurality of prior connections, that the first connection is an outlier connection.

20. The computer program product of claim 16, the operations further comprising:
before identifying the one or more connections, identifying a second one or more connections between the client application and the one or more services, over the communication network; and
determining not to switch from the outlier connection learning phase to the outlier connection detection phase based on the second identified or more connections, comprising:
determining, based on the confidence level and a second number of connections analyzed prior to identifying the second one or more connections, not to switch to the outlier connection detection phase.

* * * * *